Aug. 4, 1964 W. S. ERNEST 3,143,718
MECHANICO-ELECTRIC TRANSDUCER
Filed Sept. 18, 1959 2 Sheets-Sheet 1
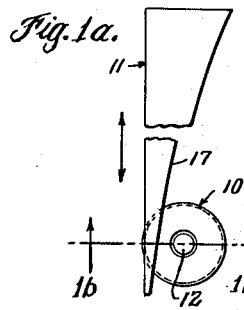
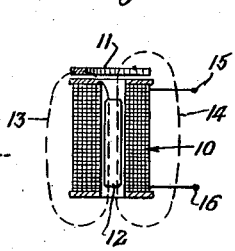
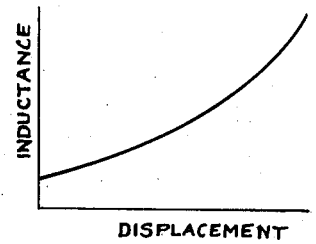
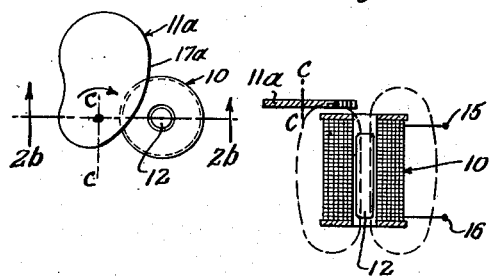
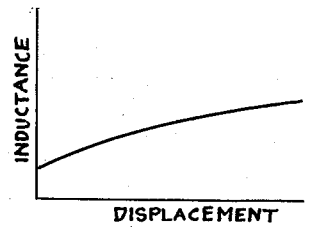
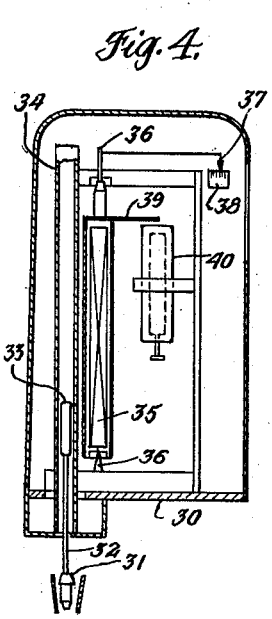
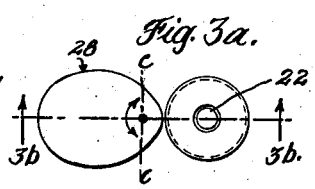
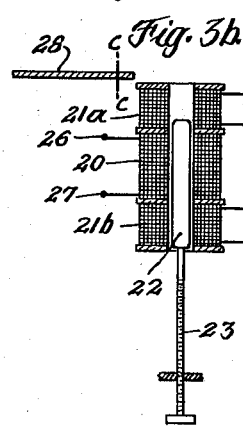
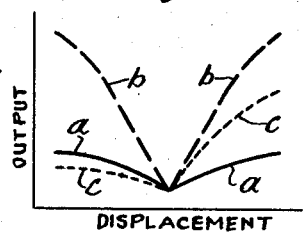
INVENTOR
WILLIAM S. ERNEST
BY
Symmestvedt & Lechner
ATTORNEYS Aug. 4, 1964 — W. S. ERNEST — 3,143,718
MECHANICO-ELECTRIC TRANSDUCER
Filed Sept. 18, 1959 — 2 Sheets-Sheet 2
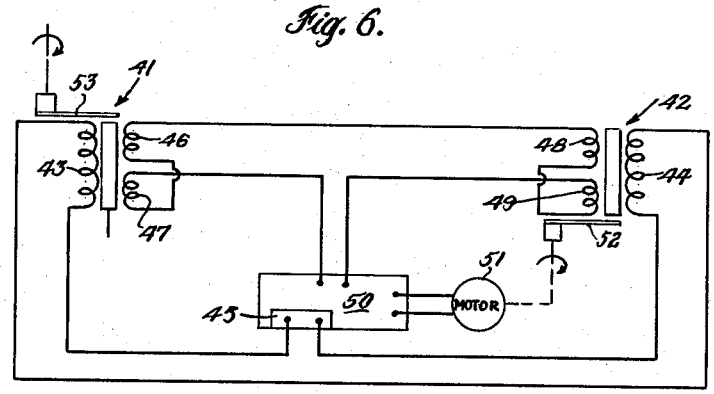
Fig. 6.
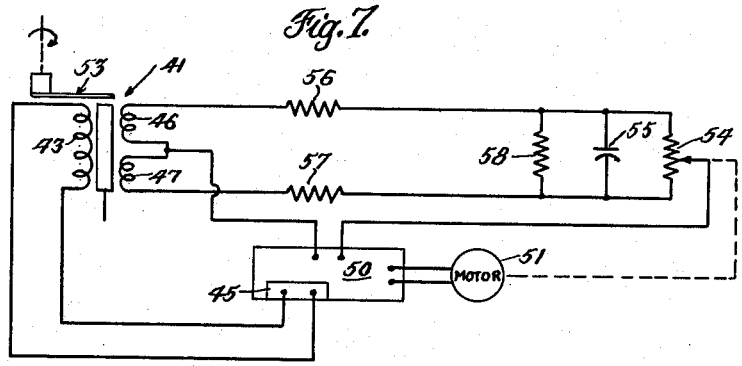
Fig. 7.
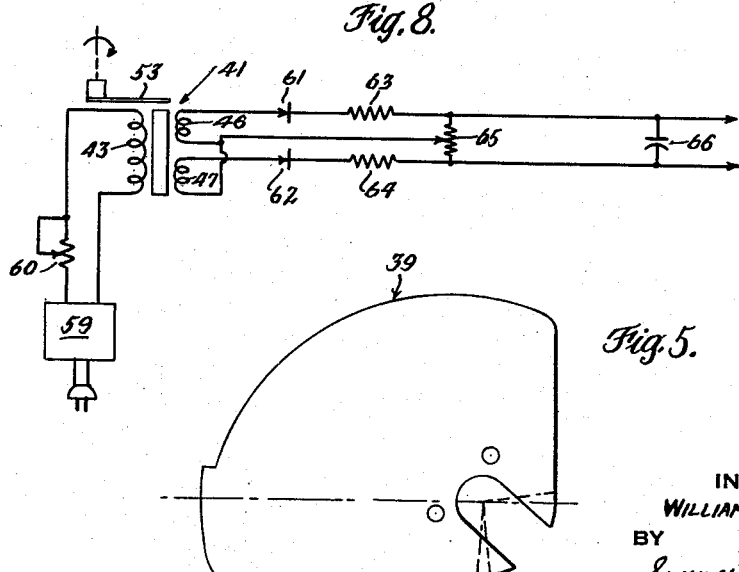
Fig. 8.
Fig. 5.
INVENTOR
WILLIAM S. ERNEST
BY Synnestvedt + Lechner
ATTORNEYS

United States Patent Office 3,143,718
Patented Aug. 4, 1964

3,143,718
MECHANICO-ELECTRIC TRANSDUCER
William S. Ernest, Lansdale, Pa., assignor to Brooks Instrument Company, Inc., a corporation of Pennsylvania
Filed Sept. 18, 1959, Ser. No. 840,896
7 Claims. (Cl. 336—30)

This invention relates to mechanico-electric transducers and is particularly concerned with a transducer whose electrical output bears a predetermined or pre-selected relationship to the position of a mechanical input element.

According to the invention, a portion of the flux path moving through a coil passes through an element which is movable through a series of positions in the flux path, the entrant surface of the element being characterized, as a cam is characterized, so that the reluctance of the path and hence the inductance of the coil are varied at a rate which is determined by both the rate of movement of the element and the "rate of rise," or characterization, of the entrant surface.

The inductance device, in its simplest form, may be no more than a helical coil, with or without an axial core of ferro-magnetic material; and the movable element, also of ferro-magnetic material, may be of cam-like configuration mounted for angular or translational movement through the flux path linking the turns of the coil.

One embodiment of the invention involves the use of a differential transformer, which may be of generally conventional construction, but in which the axial core conventionally used as a mechanical input element is either fixed or relegated to the role of providing a zero adjustment, and the movable cam element of the invention is arranged for angular movement in a plane transverse the axis of the transformer into a portion of the flux path not occupied by the axial core.

It is a principal object of the invention to provide a variable inductance device capable of producing an electrical output signal whose value is a predetermined function—which may be non-linear—of the value of a mechanical input signal.

More particularly, it is an object of the invention to provide an electrical output signal whose instantaneous value changes according to a predetermined function or law with changes in the positions of a mechanical input element.

A still further object of the invention is to achieve the foregoing objectives while preserving infinite resolution.

Yet another object of the invention is to provide an electrical output signal whose instantaneous value is related by a predetermined law to the instantaneous position of a mechanical input element and to indicate the departure of said mechanical input element from a reference position in either of two directions by output signals of opposite phase.

Another object of the invention is to provide a variable differential transformer which is capable of sensing the position or motion of a moving body movable through a range exceeding the largest dimension of the transformer coil assembly.

Still further, the invention contemplates a class of variable differential transformers adaptable to a wide variety of applications without variation in the electrical properties of the transformer, so that when a system containing a plurality of such transformers is assembled, respective ones of the transformers may be conveniently adapted to accept mechanical input signals of widely differing amplitudes and to generate electrical output signals of the same order of magnitude and with comparable source impedance, etc.

How the foregoing and other objects are attained will be more fully understood by the description which follows and the drawings in which:

FIG. 1a is a diagrammatic plan view of a transducer constructed in accordance with the invention and adapted to indicate the position of a body movable in a linear translational path;

FIG. 1b is a vertical sectional view of the transducer of FIG. 1a taken along the line 1b—1b of FIG. 1a;

FIG. 1c is a graph illustrating qualitatively an example of the relationship between inductance and displacement which may be realized according to the invention;

FIG. 2a is a diagrammatic plan view of another embodiment of the invention adapted to indicate the position of a body movable in an angular path;

FIG. 2b is a vertical sectional view of the transducer of FIG. 2a taken along the line 2b—2b of FIG. 2a;

FIG. 2c is a graph illustrating qualitatively another kind of relationship obtainable according to the invention between inductance and displacement;

FIG. 3a is a plan view of yet another transducer constructed in accordance with the invention and adapted to indicate the motion of a body which is angularly movable in either of two directions from a reference portion.

FIG. 3b is a vertical sectional view taken along the line 3b—3b of FIG. 3a;

FIG. 3c is a graphical representation of three different kinds of relationships between mechanical input and electrical output which can be obtained according to the invention;

FIG. 4 is a diagrammatic view illustrating the application of the transducer of the invention to a rotameter;

FIG. 5 is a plan view of a portion of the mechanism of FIG. 4; and

FIGS. 6, 7, and 8 are schematic diagrams of electrical circuits in which transducers according to the invention can be used.

The embodiment of my invention illustrated in FIG. 1a comprises a coil 10, and, movable relative thereto, a ferro-magnetic cam member 11. The device may include a ferro-magnetic core 12 arranged coaxially with coil 10. If an alternating current is developed in the windings of coil 10, an external magnetic field will be developed; such a field is indicated diagrammatically by the flux lines 13 and 14 in FIG. 1b. It will be noted that flux line 14 extends upwardly as seen in FIG. 1b beyond the plane of cam member 11. Flux line 13 flows through the portion of cam member 11 which overlies the top surface of coil 10. The pattern of flux lines of FIG. 1b thus illustrates the fact that the portion of the external field on the left side of coil 10, as seen in FIG. 1b, is shorter than the flux path on the right side of the coil; or to state the matter in another way, that the field is intensified by the presence of cam member 11.

If, now, cam member 11 is advanced in a downward direction, as seen in FIG. 1a, more of its mass will overlie coil 10 so that a larger proportion of the field of coil 10 will pass through the ferro-magnetic material of cam member 11. Accordingly, the strength of the field around the coil will be increased. If the inductance of coil 10 is measured by an appropriate circuit connected to terminals 15 and 16, a measurable change in inductance will be observed upon relative movement of coil 10 and cam member 11, and the change in the inductance so measured will be proportional to both the rate at which cam member 11 is moved and to the "rate of rise" or "characterization" of the right-hand surface 17 of cam member 11.

Cam member 11 may be provided with a constant taper; or the surface 17 may be curved, either concavely or convexly; or the surface 17 may be configured according to any predetermined function or law, either simple or complex.

FIG. 1c illustrates qualitatively the relationship between the measured inductance of coil 10 and relative displacement of the coil and cam member 11 when the surface 17 has been configured to provide for a progressively increasing inductance with change in the relative position of the two members.

FIGS. 2a and 2b illustrate the application of the invention to the problem of indicating the position of a body which is arranged for movement in an angular path. In this embodiment, coil 10 and core 12 may be similar to the corresponding members of the embodiment of FIGS. 1a and 1b; but cam 11a is mounted for rotation or oscillation about an axis c—c so that the mass of ferro-magnetic material of which cam member 11a is comprised sweeps through an angular path carrying it across the end of coil 10 in a direction transverse the axis thereof. Here again, the cam surface, or at least the entrant portion thereof, 17a may be configured to provide for any desired predetermined relationship between the inductance measured between terminals 15 and 16 and rate at which cam 11a is angularly displaced.

While the graph of FIG. 2c does not necessarily represent the behaviour of the embodiment of the invention illustrated in FIGS. 2a and 2b, it does qualitatively illustrate the fact that the transfer characteristic of the device, i.e., the relationship between the electrical output and the mechanical input, can be made to assume a variety of forms.

The embodiments illustrated in FIGS. 1a and 1b and 2a and 2b are phase insensitive and their outputs can indicate variation in the position of their respective cam members only in terms of changes in the magnitudes of the impedances—or some other property—of the coils.

The transducers of FIGS. 1a and 1b and 2a and 2b may be employed in a variety of circuits arranged to overcome that disadvantage. For example, the coil of FIG. 1b may be connected in a circuit with a similar coil, across whose terminals there is developed a voltage which is equal in magnitude to the voltage across coil 10 at some point on its transfer characteristic, but whose phase is opposite to that of coil 10. A measuring circuit can then be connected to the two coils in a manner to indicate the difference between the voltages appearing across the terminals of the two coils. When the cam is moved in a direction such as to increase the voltage appearing across the terminals of coil 10, the difference signal will assume the phase of coil 10 and have a magnitude proportional to the displacement of cam 11. If cam 11 is displaced in the opposite direction from the reference point, the phase of the balancing coil will predominate.

The embodiment of the invention illustrated in FIGS. 3a and 3b is capable of producing an output which is significant both in phase and in magnitude. This embodiment utilizes the elements of a conventional variable differential transformer, including a primary coil 20, a secondary coil 21a, a second secondary coil 21b, and a ferro-magnetic core 22, whose position is adapted to be adjusted by means of a screw 23. The differential transformer of FIGS. 3a and 3b may be externally connected in any of the circuits conventionally used with differential transformers. For example, as illustrated in FIG. 3b, the two secondary windings 21a and 21b may be connected in a series bucking circuit whose output, appearing at the terminals 24 and 25, is equal to the algebraic sum of the voltages induced in the two windings; and the primary winding 20 may be energized through terminals 26 and 27 from any convenient alternating current source.

Core 22 is mounted for movement along its own axis in a manner to differentially vary the flux linking the secondary coils 21a and 21b with primary coil 20. As is well known, when core 22 is positioned symmetrically with respect to coils 21a and 21b, substantially equal voltages will be induced in the two secondary coils; and if the latter are arranged in a circuit in which the two voltages are opposed to one another, the algebraic sum of the two voltages will be very close to zero. If the core 22 is moved in either direction from the central position, for example in the direction of coil 21a, the voltage induced in the latter will increase, the voltage induced in coil 21b will decrease, and the algebraic sum of the two voltages will increase. If the core 22 is moved in the opposite direction by the same amount from the central position, the absolute value of the output of the circuit will be the same as before, but the phase of the output voltage will be opposite to the phase under the first condition.

In a conventional variable differential transformer, the magnitude of the output voltage is intended to be linearly proportional to the movement of the axial core 22 within its design range.

According to the present invention, there is provided, in addition to the elements already discussed, a ferro-magnetic cam or armature 28 arranged to be moved through the external magnetic field of the differential transformer. In the arrangement of FIGS. 3a and 3b, the cam is arranged for angular or rotational movement about a center c—c and in a path lying in a plane transverse the axis of the transformer and adjacent one end thereof.

Operation of the arrangement of FIGS. 3a and 3b will best be understood by considering the following:

First, with the cam moved to its most remote position, (as illustrated in FIGS. 3a and 3b), core 22 is adjusted to the position in which minimum voltage appears at terminals 24 and 25 and then shifted away from the null position in the direction of secondary coil 21b, so that the output voltage now has a magnitude which is measurably greater than its magnitude at null and a phase appropriate to the direction of displacement of the core, because the flux linking primary 20 to secondary 21b will be more intense than the flux linking primary 20 to secondary 21a. If, now, cam 28 is moved into the magnetic field at the opposite end of the transformer, the flux linking primary 20 with secondary 21a will increase and the voltage induced therein will correspondingly increase, and as the cam is moved still farther it will become closer and closer in absolute value to the voltage induced in secondary 21b, with the result that the algebraic sum of the two secondary voltages will be reduced toward zero.

If the movement of cam 28 is continued, the flux linking secondary 21a will ultimately equal that linking secondary 21b, with the result that the output voltage will reach a minimum or null.

Upon still further movement of the cam, the flux linking secondary coil 21a will become greater than that linking secondary 21b with the result that the output signal once more begins to rise and will now have a phase opposite to that at the beginning.

In practice, the initial adjustment of the device is accomplished in a somewhat different way. Thus, cam 28 is moved to the position which it is desired to represent by zero, and core 22 is then adjusted to a position in which the voltage appearing between terminals 24 and 25 is at a minimum. Then movement of the cam in either direction from its zero position will cause an increase in the output voltage; and the phase of the output voltage will depend upon the direction in which the cam is moved.

If the cam is configured symmetrically about the zero point, the output voltage will rise symmetrically from its minimum or null value regardless of the direction of movement of the cam. The performance of such an arrangement is illustrated by curve a of FIG. 3c.

If it is desired that the output voltage vary linearly with displacement of the cam from its zero position, the cam surface can be configured to provide such a relationship. An output voltage of this character is illustrated by curve b of FIG. 3c.

Finally, the cam may be configured to provide a non-symmetric, non-linear output voltage as illustrated by curve c of FIG. 3c.

The arrangement just described has several important advantages over the conventional variable differential transformer. In the first place, it is possible to control the sensitivity of the device over a very wide range simply by configuring the cam surface to the appropriate rate of rise. When the rate of rise is low and the entrant surface of the cam is long, it is possible to measure the position of a body whose range of movement, either linear or angular, far exceeds the dimensions of the transformer proper. In fact, according to this aspect of the invention, the same transformer coils can be used to sense the position of bodies moving through ranges of many feet or through ranges measured in small fractions of an inch.

In the second place, it is possible to "characterize" the cam surface so that the electrical output signal varies in a known way with variations in the mechanical input signal. For example, if the body whose position is to be sensed moves at a constant linear rate and it is desired to indicate its position on a logarithmic scale, the cam surface can be cut in a way which will produce an output voltage which is a logarithmic function of the mechanical input signal.

Conversely, if the body whose position is to be sensed is a portion of an instrument whose position changes non-linearly with variations in a physical quantity to be measured, the cam can be configured to introduce a compensating non-linearity so that the output signal varies linearly with the actual quantity to be measured. Such a problem is common in the field of instrumentation; an application of the invention to one such case is illustrated in FIG. 4.

FIG. 4 depicts diagrammatically a portion of a rotameter comprising a base 30, a float 31, a float extension 32 carrying a magnet 33, the float extension and magnet 33 being adapted to rise and fall within a sealed tube 34 in accordance with variations of the rate of flow of the fluid in which float 31 is immersed. Adjacent tube 34, there is mounted for rotation a magnetic iron strip 35, twisted into helical configuration and mounted for movement on a pair of pivots 36, 36. Magnet 33 and strip 35 together serve to convert the linear motion of float 31 to an angular motion of strip 35 around the axis defined by pivots 36, 36. This motion may be indicated locally by a pointer 37 cooperating with a scale 38.

Remote indication is provided by a cam 39 mounted in juxtaposition to a variable differential transformer generally indicated at 40, the construction of transformer 40 and the relationship of cam 39 and transformer 40 being similar to the arrangement of FIGS. 3a and 3b.

Cam 39, however (depicted in plan form in FIG. 5), is configured in a way to compensate for the non-linearity which is known to exist between the actual rate of flow and movement of float 31.

The characterization of cam 39 is determined by plotting the actual rotameter calibration data on polar coordinates in the form of a curve, and then configuring the profile of the cam surface to conform with the curve. When this is done, the voltage output of the transformer is exactly linear with the flow rate regardless of any lack of linearity between the float position and flow rate. Even where there are marked departures from linearity between float position and flow rate—as where extremely small flows are to be measured or where viscosity effects are significant—the cam can be configured in a manner to produce a linear output.

A follow-up system employing two of my novel transducers is illustrated in FIG. 6. In this system the sensing transducer is indicated generally at 41 and the follow-up transducer at 42. Primary winding 43 of the sensing transducer and primary 44 of the follow-up transducer are connected in series and energized from an alternating current supply 45. The secondary windings 46 and 47 of the sensing transducer are connected in a voltage bucking circuit, as are secondary windings 48 and 49 of the follow-up transducer; and the two sets of voltages are connected in series bucking to the input of an amplifier generally indicated at 50. The output of amplifier 50 is used to control the motor 51 in a known way; and cam 52 of the follow-up transducer is arranged to be driven by motor 51. When cam member 53 of the sensing transducer is moved relative to sensing transducer 41, an unbalanced voltage appears at the input to amplifier 50, with the result that motor 51 is energized and rotates in a direction such as to introduce compensating unbalance in follow-up transducer 42; when the circuit is once more balanced, the motor 51 stops. In this way, the position of the shaft of motor 51 can be made to conform in any desired way to the position of whatever angularly moving body is connected to cam member 53 of sensing transducer 41.

If, for example, the body whose position is to be sensed moves through an angular range of 5° and the controlled instrumentality is capable of moving through 100°, cams 53 and 52 are characterized in a manner to produce the same range of output voltage variation on angular movement through, respectively, 5° and 100°.

In another case it may be desirable to indicate, by the angular position of a pointer, the position of a body moving over a rectilinear range of several feet. In such a case, a cam such as cam 11 of FIG. 1a is substituted for cam 53 in FIG. 6 and characterized to shift the output voltage of transformer 41 through its full range as the transformer sweeps over the full length of the rectilinear cam.

Similarly, cam 52 is characterized to produce a full range variation in output voltage of transformer 42 on angular movement of cam 52 through whatever angular range is convenient for representation by means of a pointer.

It will further be understood that variable differential transformer coil configurations different from that illustrated in FIGS. 3a and 3b may be used, including arrangements in which the primary winding is divided into sections each of which is interwound with one of two secondary windings.

A somewhat similar arrangement is illustrated in FIG. 7; but here the follow-up transducer comprises a slide wire potentiometer 54 arranged in a null balance circuit comprising reactance 55 and resistors 56, 57 and 58. In this arrangement motor 51 drives potentiometer 54 to restore the system to balance in a manner analogous to the operation of the system in FIG. 6; but with the disadvantage that potentiometer 54 is a device with finite resolving power so that accuracy of positioning motor shaft 51 must inevitably be limited by the resolution obtainable in the design of potentiometer 54.

In FIG. 8 I have illustrated a circuit by means of which a direct current output signal may be obtained whose absolute magnitude will indicate the amount of displacement of cam member 53 and whose polarity will indicate the sense of displacement.

The arrangement of FIG. 8 includes a source 59 of regulated alternating current, a resistor 60 for adjusting the energizing current to its desired value, a pair of rectifiers 61, 62, a pair of load resistors 63, 64, a zero balance potentiometer 65 and filter capacitor 66.

It will be understood that while I have illustrated in

FIGS. 6 through 8 the use of cams mounted for angular movement, the same circuits may be used in connection with cams whose motion relative to the sensing coil is translational.

The controllable sensitivity of the variable transformer of the invention may be exploited in a follow-up system in which the primary sensing transducer is more sensitive than the follow-up transducer.

In such a system, the mechanical input may be derived from a body which moves over a very short range, say of .001 of an inch. On the other hand, the controlled instrumentality to be driven by the system may move over a range of several inches or even more.

Such a system clearly calls for a sensitive variable differential transformer (VDT) for the primary sensing element; but a difficulty is encountered at the follow-up end of the system, since it is desirable to use a VDT at the follow-up end whose electrical characteristics are identical with those of the primary sensing transducer. If a second sensitive VDT is employed at this point, and if the element to be driven by the system is an element which must be driven through a range of several inches, it becomes necessary to provide a complex mechanical linkage for driving the follow-up transducer from the output element which is capable of reducing the range of movement from several inches to a dimension of the order of .001 of an inch.

According to my invention, I employ as a follow-up transducer in such a system, a variable differential transformer whose coils and axial core are identical with those of the primary transducer. I then employ a movable cam mounted for movement with the output element of the system and configured to provide a full range variation in the output of the followup transformer upon movement of the output element through its full range.

I claim:

1. A position indicating transducer comprising primary coil means, first and second secondary coil means coaxial therewith, axial core means providing a ferro-magnetic flux path for a portion of the flux linking said primary and secondary coil means movable through a range including a position in which currents of equal amplitude are induced in said two secondary coil means and including another position in which the magnitude of the current induced in said first secondary coil means is greater than that induced in said second secondary coil means, a mechanical input element comprising a mass of ferro-magnetic material mounted for movement in a path transverse the axis of said coils and passing through a portion of the flux path linking said primary coil means with said second secondary coil means, successive cross-sections of said mass taken transverse the path of movement thereof being of different areas, and circuit means for opposing the voltage appearing at the terminals of one of said secondary coil means to the voltage appearing at the terminals of the other secondary coil means and said circuit including signal means responsive to the net voltage resulting from the opposition of the voltages appearing at the terminals of the two secondary coil means.

2. Means for comparing the positions of two bodies movable with respect to a reference body, comprising a pair of variable differential transformers fixed to the reference body each having a mechanical input element comprising a mass of ferro-magnetic material movable through a portion of the flux path linking the transformer primary winding with the transformer secondary winding, one of said masses being mounted for movement relative to its associated transformer in a path transverse the axis of the secondary coil thereof, successive cross-sections of said last-mentioned mass taken transverse the path of movement thereof being of different areas; and said two masses being respectively connected with said two bodies for movement therewith.

3. Means in accordance with claim 2 in which the range of movement of one of said two bodies is greater than the corresponding range of the other body, in which the coil structures of said variable differential transformers are substantially the same, and in which said one mass is connected to the body having the greater range of movement.

4. A transducer for producing an electrical signal whose instantaneous amplitude is a known function of the instantaneous position of a movable body in relation to a reference body, comprising a coil member, means for developing an alternating current of substantially constant frequency in said coil member thereby producing a magnetic field linking the windings of said coil member, a mechanical input member mounted for movement relative to said coil member in a path extending transverse the axis of the coil member relatively close to one end thereof and relatively remote from the other end thereof and passing through said magnetic field, one of said members being connected with said body for movement therewith and the other being connected with the reference body in relation to which the position of said first body is to be determined, said input element comprising a mass of ferro-magnetic material, and successive cross-sections of said mass taken transverse the path of movement thereof having cross-sectional areas varying in accordance with said known function.

5. A position indicating transducer comprising primary and secondary coil means arranged to form a differential transformer, axial core means adjustable to a position away from the null position toward one end of the transformer to increase the voltage appearing across the terminals of the secondary at said one end of the transformer differentially with respect to the voltage appearing at the terminals of the secondary means at the other end of the transformer, and cam means mounted for movement relative to the other end of the transformer in a path extending transverse the axis of the transformer and through a portion of the flux path linking the primary coil and the secondary coil at said other end of the transformer, successive cross-sections of said cam taken transverse the path of movement thereof being of different cross-sectional areas, with small and large cross-sectional areas spaced from each other along said path of movement and with successive cross-sectional areas between said small and large areas progressively increasing in size from the small area to the large area, and the smallest of said areas being selected to increase the flux density through the secondary coil means at said other end of the transformer by an amount insufficient to increase the voltage appearing at the terminals of the secondary coil at said other end to the level of the voltage appearing at the terminals of the secondary coil at the first end of the transformer, and another of said areas being large enough to increase the flux through the secondary coil at said other end sufficiently to increase the voltage appearing at the terminals of such coil to a value exceeding the voltage appearing at the terminals of the coil at the first end of the transformer.

6. A transducer comprising a primary coil, a source of alternating current for energizing said primary coil, secondary coil means comprising two sections arranged in flux linking relationship with said primary coil, circuit means interconnecting said sections in voltage opposing series with each other; means for measuring the algebraic sum of said voltages, adjustable core means arranged in the path of flux linking said primary coil and said secondary coil means and adjustable into and from a position in which said algebraic sum is zero, movable core means movable in a plane into and from a portion of the flux path linking said primary coil and one of said sections, a portion of an edge of said movable core means constituting a cam surface whose profile is configured to vary the flux linkage between said primary coil and said one section at a rate which will cause a variation in said algebraic sum which has a predetermined realtionship to the variation of position of said movable core means during movement thereof.

7. A variable differential transformer having primary coil means, secondary coil means coaxial therewith, and axial core means, and further having a movable armature movable through a path adjacent said coil means, said path traversing a portion of the external flux path linking said primary and secondary coil means, a portion of said armature which is leading upon motion of the armature into said flux path being configured to provide for increase of flux linkage between said coil means at a rate which is different from the rate at which said armature is advanced into said path.

References Cited in the file of this patent

UNITED STATES PATENTS

| | | |
|---|---|---|
| 2,419,979 | Wilson | May 6, 1947 |
| 2,462,095 | Halpert et al. | Feb. 22, 1949 |
| 2,494,493 | Schaevitz | Jan. 10, 1950 |
| 2,523,198 | Davies | Sept. 19, 1950 |
| 2,564,221 | Hornfeck | Aug. 14, 1951 |
| 2,585,604 | Vonnegut et al. | Feb. 12, 1952 |
| 2,708,730 | Alexander et al. | May 17, 1955 |
| 2,774,057 | Jones | Dec. 11, 1956 |
| 2,978,599 | Wilcox | Apr. 4, 1961 |

FOREIGN PATENTS

| | | |
|---|---|---|
| 882,487 | France | June 4, 1943 |

UNITED STATES PATENT OFFICE
CERTIFICATE OF CORRECTION

Patent No. 3,143,718                                            August 4, 1964

William S. Ernest

It is hereby certified that error appears in the above numbered patent requiring correction and that the said Letters Patent should read as corrected below.

Column 1, line 13, for "moving" read -- flowing --; column 2, line 4, for "forging" read -- foregoing --; line 27, for "portion" read -- position --; column 7, line 34, for "followup" read -- follow-up --.

Signed and sealed this 1st day of December 1964.

(SEAL)
Attest:

ERNEST W. SWIDER                                       EDWARD J. BRENNER
Attesting Officer                                           Commissioner of Patents